(12) United States Patent
Moran

(10) Patent No.: US 11,173,864 B2
(45) Date of Patent: Nov. 16, 2021

(54) CURTAIN AIRBAG WITH INTEGRAL AIRBAG WRAP

(71) Applicant: ZF Passive Safety Systems US Inc., Washington, MI (US)

(72) Inventor: Dylan Moran, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 99 days.

(21) Appl. No.: 16/658,261

(22) Filed: Oct. 21, 2019

(65) Prior Publication Data

US 2021/0114545 A1    Apr. 22, 2021

(51) Int. Cl.
*B60R 21/232*    (2011.01)
*B60R 21/201*    (2011.01)

(52) U.S. Cl.
CPC .......... *B60R 21/232* (2013.01); *B60R 21/201* (2013.01)

(58) Field of Classification Search
CPC .... B60R 21/232; B60R 21/201; B60R 21/213
USPC ...................................................... 280/730.2
See application file for complete search history.

(56) References Cited

U.S. PATENT DOCUMENTS

| 8,240,701 B2 * | 8/2012 | Cheal ................... B60R 21/201 |
| | | 280/728.2 |
| 2005/0104335 A1 * | 5/2005 | Henderson ............ B60R 21/213 |
| | | 280/728.2 |
| 2006/0192368 A1 * | 8/2006 | Hall ...................... B60R 21/213 |
| | | 280/730.2 |
| 2008/0284142 A1 * | 11/2008 | Cheal ................... B60R 21/213 |
| | | 280/730.2 |
| 2010/0327564 A1 * | 12/2010 | Cheal ................... B60R 21/201 |
| | | 280/728.2 |
| 2013/0093167 A1 * | 4/2013 | Volkmann ............. B60R 21/232 |
| | | 280/729 |
| 2015/0102588 A1 * | 4/2015 | Cheal ................... B60R 21/201 |
| | | 280/728.2 |
| 2015/0191141 A1 * | 7/2015 | Wang ................... B60R 21/216 |
| | | 280/730.2 |
| 2015/0239415 A1 * | 8/2015 | Tsujimoto ............... B60R 21/20 |
| | | 280/728.2 |
| 2015/0291119 A1 * | 10/2015 | Noma ................... B60R 21/201 |
| | | 280/728.2 |
| 2017/0043739 A1 * | 2/2017 | Arellano ............... B60R 21/213 |
| 2019/0092265 A1 * | 3/2019 | Kakimoto ............. B60R 21/232 |
| 2021/0031719 A1 * | 2/2021 | Montgomery ........ B60R 21/232 |
| 2021/0146871 A1 * | 5/2021 | Patton .................. B60R 21/232 |

FOREIGN PATENT DOCUMENTS

WO    WO-2020123751 A1 *    6/2020    ........... B60R 21/213

\* cited by examiner

*Primary Examiner* — Paul N Dickson
*Assistant Examiner* — Mary E Young
(74) *Attorney, Agent, or Firm* — Tarolli, Sundheim, Covell & Tummino LLP

(57) ABSTRACT

An apparatus for helping to protect an occupant of a vehicle includes a curtain airbag having a stored condition in which the curtain airbag is deflated, flattened, and rolled and/or folded. The apparatus further includes a wrap that comprises an integral woven portion of the curtain airbag formed from a fabric extension of an upper edge of the curtain airbag. The wrap is configured to be wrapped about a circumference of the rolled and/or folded curtain airbag to package the curtain airbag in the stored condition.

32 Claims, 14 Drawing Sheets

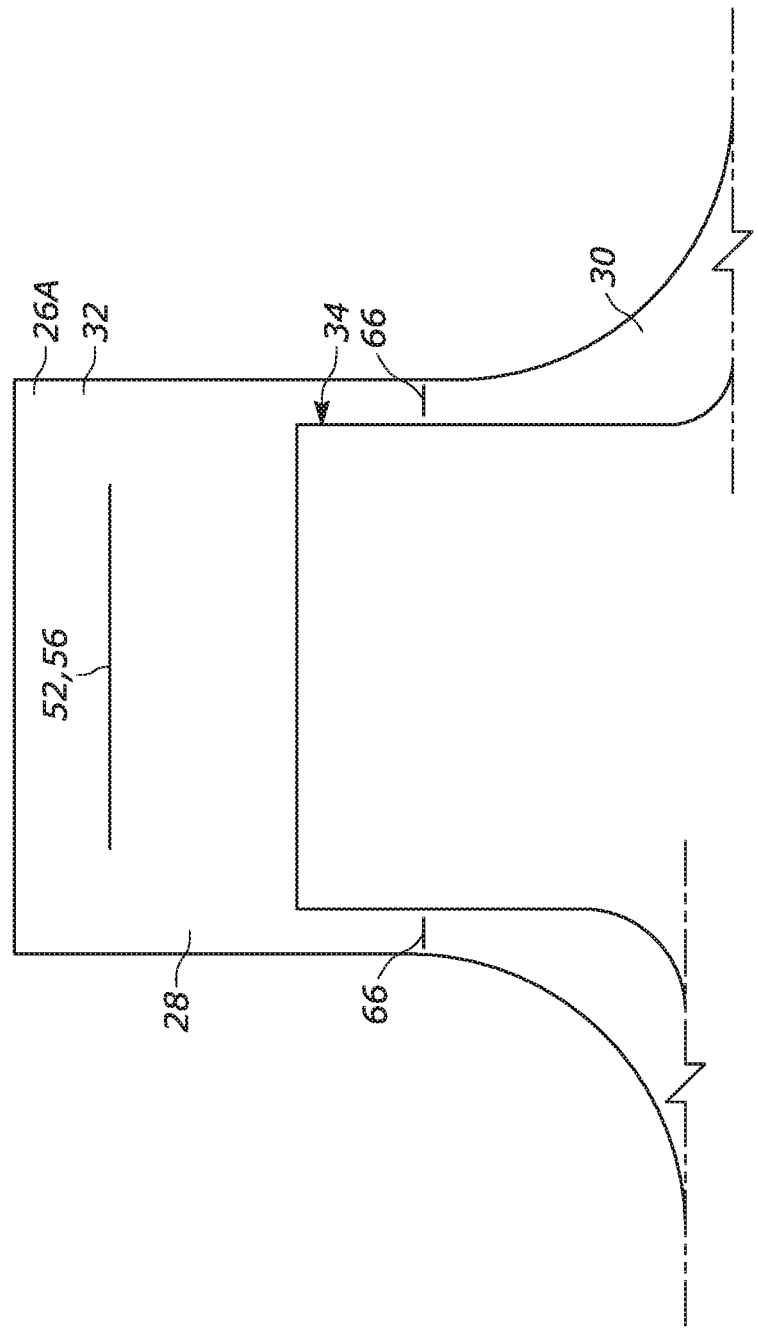

CURTAIN AIRBAG WITH INTEGRAL AIRBAG WRAP

FIELD OF THE INVENTION

The invention relates to an apparatus for helping to protect an occupant of a vehicle. More particularly, the invention relates to an airbag inflatable between a vehicle occupant and a side structure of a vehicle and means for packaging the airbag.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that is fixed to the roof of the vehicle and/or to a support structure adjacent to the roof of the vehicle. The inflatable curtain is configured to inflate from the roof of the vehicle downward inside the passenger compartment in the event of a side impact or a vehicle rollover. The inflatable curtain, when inflated, is positioned between a vehicle occupant and the side structure of the vehicle.

Inflatable curtains are typically placed in the stored condition by rolling and/or folding. Rolling is, however, typically the primary manner in which inflatable curtains are placed in a packaged condition, ready for installation in the vehicle. The "packaged condition" refers to the inflatable curtain in its ready-to-install condition, regardless of whether it is rolled, folded, or a combination of rolled and folded. In the packaged condition, the CAB can also include additional features and/or structures, such as packaging sleeves and/or wraps, installation and/or fastening structures (fasteners, clamps, brackets, etc.), and inflation components, such as inflators, fill tubes, diffusers, etc.

Certain inflatable curtains utilize the packaging sleeves and/or wraps to hold the inflatable curtain in the package condition. These packaging sleeves and/or wraps are typically formed separately from the inflatable curtain. In some instances, these separately formed packaging sleeves and/or wraps are made from materials that are different than the airbag fabric that forms the inflatable curtain. In other instances, the separately formed packaging sleeves and/or wraps are made from the same material used to form the curtain airbag. Regardless of the construction, the process for packaging the inflatable curtains using the separately formed packaging sleeves and/or wraps requires additional steps of manufacturing the packaging sleeves and/or wraps and attaching the separately formed packaging sleeves and/or wraps to, or installing the separately formed packaging sleeves and/or wraps on, the rolled and/or folded inflatable curtain.

SUMMARY OF THE INVENTION

According to one aspect, an apparatus for helping to protect an occupant of a vehicle includes a curtain airbag having a stored condition in which the curtain airbag is deflated, flattened, and rolled and/or folded. The apparatus further includes a wrap comprising an integral woven portion of the curtain airbag formed from a fabric extension of an upper edge of the curtain airbag. The wrap is configured to be wrapped about a circumference of the rolled and/or folded curtain airbag to package the curtain airbag in the stored condition.

According to another aspect, alone or in combination with any other aspect, the wrap can be configured to be attached to the curtain airbag along the upper edge of the curtain airbag after being wrapped about the circumference of the rolled and/or folded curtain airbag.

According to another aspect, alone or in combination with any other aspect, the wrap can have a first end portion where the wrap merges with the upper edge of the curtain airbag, and an opposite, free second end portion configured for a connection to the upper edge of the curtain airbag to maintain the packaging of the curtain airbag in the stored condition.

According to another aspect, alone or in combination with any other aspect, the second end portion of the wrap can comprise a retention feature configured to cooperate with an attachment feature positioned at the upper edge of the curtain airbag.

According to another aspect, alone or in combination with any other aspect, the retention feature and the attachment feature can be formed from the curtain airbag fabric.

According to another aspect, alone or in combination with any other aspect, the wrap can have a free end portion with a retention feature that cooperates with an attachment feature of the airbag to maintain the packaging of the curtain airbag in the stored condition.

According to another aspect, alone or in combination with any other aspect, the curtain airbag can comprise a mounting tab for mounting the curtain airbag to the vehicle. The wrap can be configured to be attached to the mounting tab after being wrapped about the circumference of the rolled and/or folded curtain airbag.

According to another aspect, alone or in combination with any other aspect, the mounting tab can comprise a portion of the extension defined by a slit that separates the mounting tab from the wrap.

According to another aspect, alone or in combination with any other aspect, the mounting tab can comprise a central portion of the extension and the wrap cam comprise a portion of the extension that extends along a periphery of the mounting tab.

According to another aspect, alone or in combination with any other aspect, the second end portion of the wrap can comprises a retention feature configured to cooperate with an attachment feature positioned at the upper edge of the curtain airbag. The retention feature and the attachment feature can be formed from the curtain airbag fabric.

According to another aspect, alone or in combination with any other aspect, the retention feature can comprise a slit opening in the second end portion of the wrap. The attachment feature can comprise edge slits formed in opposite edges of the mounting tab. The mounting tab can be configured to pass through the slit opening in the second end portion of the wrap. The retention portions of the wrap at opposite ends of the slit opening can be configured to be received in the edge slits to secure the second end portion of the wrap to the mounting tab.

According to another aspect, alone or in combination with any other aspect, the slit opening can have a length that is shorter than a width of the mounting tab. The edge slits can be configured such that they terminate a distance from each other that is about equal to the length of the slit opening.

According to another aspect, alone or in combination with any other aspect, the edge slits can be configured to extend at an acute angle with respect to the slit opening when the mounting tab is received in the slit. The acute angle can be selected such that tension forces that would urge the mounting tab to be removed from the slit opening would urge the retention portions of the wrap into the edge slits.

According to another aspect, alone or in combination with any other aspect, the retention feature and the attachment feature can comprise a wrap opening and an associated mounting tab opening for receiving a fastening structure for initially supporting the packaged curtain airbag in the vehicle. The wrap opening and mounting tab opening can be configured to overlie each other when the curtain airbag is in the packaged condition.

According to another aspect, alone or in combination with any other aspect, the fastening structure can comprise one of a fir tree fastener, a push pin fastener, and a clip fastener.

According to another aspect, alone or in combination with any other aspect, the wrap opening and the mounting tab opening can be keyhole openings.

According to another aspect, alone or in combination with any other aspect, the keyhole openings can have a small diameter upper portion and a large diameter lower portion. The small diameter upper portion can be dimensioned to be about equal to a diameter of a shank of the fastening structure and to form an interference with a head of the fastening structure. The large diameter lower portion can be larger than the small diameter upper portion and the shank of the fastening structure.

According to another aspect, alone or in combination with any other aspect, the extension can have a length measured lengthwise along the upper edge of the curtain airbag. The wrap can be defined by a slit cut lengthwise along the extension to separate the wrap from the upper edge of the curtain airbag.

According to another aspect, alone or in combination with any other aspect, the extension can have a width that is equal to the width of the wrap such that the integral addition of the wrap to the curtain airbag requires only the fabric that forms the wrap.

According to another aspect, alone or in combination with any other aspect, the wrap, in a lied flat and unfolded configuration, can extend lengthwise along the upper edge of the curtain airbag.

According to another aspect, alone or in combination with any other aspect, the retention feature and the attachment feature can comprise a wrap opening and an associated opening along the upper edge of the curtain airbag for receiving a fastening structure for initially supporting the packaged curtain airbag in the vehicle. The wrap opening and opening along the upper edge of the curtain airbag can be configured to overlie each other when the curtain airbag is in the packaged condition.

According to another aspect, alone or in combination with any other aspect, the wrap can have rupturable portion configured to rupture in response to deployment of the curtain airbag.

According to another aspect, alone or in combination with any other aspect, the curtain airbag can be a one-piece woven curtain airbag. The wrap can be an integral woven portion of the OPW curtain airbag.

According to another aspect, alone or in combination with any other aspect, the curtain airbag can be formed from a plurality of woven pieces that are interconnected to one another. The wrap can be an integral woven portion of the woven pieces that form the curtain airbag.

According to another aspect, alone or in combination with any other aspect, a curtain airbag module can comprise the apparatus and an inflator for inflating the curtain airbag.

According to another aspect, alone or in combination with any other aspect, a vehicle safety system can comprise the curtain airbag module and a controller configured to actuate the inflator to cause deployment of the curtain airbag in response to detecting a vehicle crash condition.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIGS. 2-3 are a side view of an element of the apparatus of FIG. 1, including a first configuration for a portion of the apparatus;

DETAILED DESCRIPTION OF THE INVENTION

Figure 1:
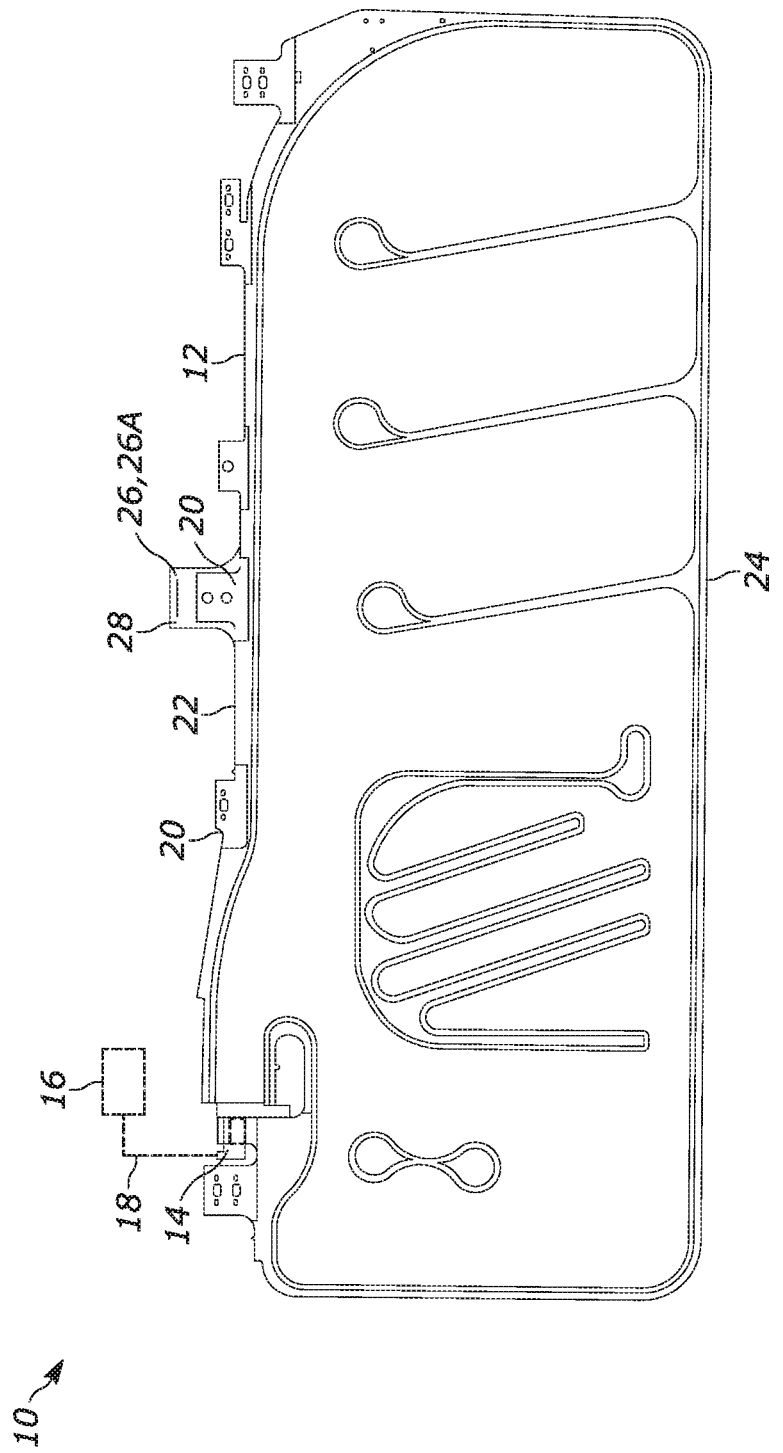
FIG. 1 is a schematic view illustrating an apparatus for helping to protect an occupant of a vehicle.

As shown in FIG. 1, an apparatus 10 for helping to protect an occupant of a vehicle includes an inflatable vehicle occupant protection device 12 in the form of an airbag, such as a curtain airbag, for helping to protect the vehicle occupant. The curtain airbag 12 can be constructed of any suitable material, such as nylon (e.g., woven nylon 6-6 yarns), and can be constructed in any suitable manner. For example, the curtain airbag 12 may have a one-piece woven (OPW) construction in which the curtain airbag is woven as a single piece of material. As another example, the curtain airbag 12 can include more than one piece of material. If more than one piece is used, the pieces can be interconnected by known means, such as stitching, ultrasonic welding, heat bonding, or adhesives, to form the curtain airbag 12. The curtain airbag 12 can be uncoated, coated with a material, such as a gas impermeable urethane, or laminated with a material, such as a gas impermeable film. The curtain airbag 12 thus can have a gas-tight or substantially gas-tight construction. Those skilled in the art will appreciate that alternative materials, such as polyester yarn, and alternatives coatings, such as silicone, can also be used to construct the curtain airbag 12.

An inflator 14 is operatively connected to the curtain airbag 12 and is actuatable to provide inflation fluid for inflating the curtain airbag from a stored condition to a deployed condition. The inflator 14 can be of any known type, such as stored gas, solid propellant, augmented, or hybrid. An airbag controller 16 can be operatively connected to the inflator 14 via lead wires 18. The airbag controller 16 is configured to actuate the inflator 14 in response to sensing the occurrence of an event for which occupant protection is desired, such as a collision.

The curtain airbag 12 can be mounted to a support structure of the vehicle. The support structure can be any structure in the vehicle that will accommodate the curtain airbag 12 being deployed therefrom so that the deployed curtain airbag is positioned between a side structure of the vehicle, such as a vehicle door, a side window, a roof rail, and/or a vehicle pillar, and a vehicle occupant. The support structure can be a roof rail of the vehicle. The curtain airbag 12 can be mounted to the roof rail in any desired manner. In the example configuration depicted in FIG. 1, the curtain airbag 12 includes a plurality of mounting tabs 20 for mounting the curtain airbag to the roof rail. The plurality of mounting tabs are spaced lengthwise along an upper edge 22 of the curtain airbag 12.

To install the curtain airbag 12 in the vehicle, the curtain airbag is first placed into the stored condition in which the curtain airbag is deflated, flattened, and rolled and/or folded. FIG. 1 depicts the curtain airbag 12 in a deflated and flattened condition. The deflated and flattened curtain airbag 12 is then rolled and/or folded such as by rolling a lower edge 24 of the curtain airbag upward toward the upper edge 22 of the curtain airbag. Once the curtain airbag 12 is rolled and/or folded into the stored condition, the curtain airbag can be packaged. By "package" or "packaged," it is meant that the curtain airbag 12 is maintained in the stored condition so that the curtain airbag and certain associated components, such as inflators, fill tubes, connectors, etc., can be installed in the vehicle as a unit. Thus, reference to "packaging the curtain airbag" and the like means placing the curtain airbag 12 into a condition in which the curtain airbag is maintained in the stored condition so that the curtain airbag is in a ready-to-install condition. Reference to the "packaged curtain airbag," "the curtain airbag package," and/or the like means a curtain airbag 12 that is maintained in the stored condition so that the curtain airbag is in a ready-to-install condition.

Certain curtain airbags utilize wrapping structures, such as packaging sleeves and/or wraps, to hold the curtain airbag in the packaged condition. These wrapping structures are typically formed separately from the curtain airbag. In some instances, these separately formed wrapping structures are made from materials that are different than the airbag fabric that forms the inflatable curtain. In other instances, the separately formed wrapping structures are made from the same material used to form the curtain airbag. Regardless of the construction, the process for packaging a curtain airbag using the separately formed wrapping structures requires additional steps of manufacturing the separately formed wrapping structures and attaching the separately formed wrapping structures to, or installing the separately formed wrapping structures on, the rolled and/or folded curtain airbag.

To help reduce the use of additional material and the manufacturing steps required to package the curtain airbag 12, the apparatus 10 includes a wrap 26 formed as an integrally woven portion of the curtain airbag, which takes the form of a fabric extension 28 of the upper edge 22 of the curtain airbag. The wrap 26 is configured to be wrapped about the circumference of the rolled and/or folded curtain airbag 12 and secured to itself, to the curtain airbag, to the vehicle, or to another structure, such as a fastener, to package the curtain airbag in the stored condition.

From the description set forth herein, it will be appreciated that the wrap 26 may have various configurations, some of which will be discussed below in FIGS. 2-17, which depict example configurations of the wrap 26. The example configurations are not necessarily exclusive of each other. Those skilled in the art will appreciate that certain features can be shared and/or combined between the example configurations whether expressly stated, shown, or not. Common elements shared between the example configurations of the wrap 26 include common reference characters.

Figure 2:
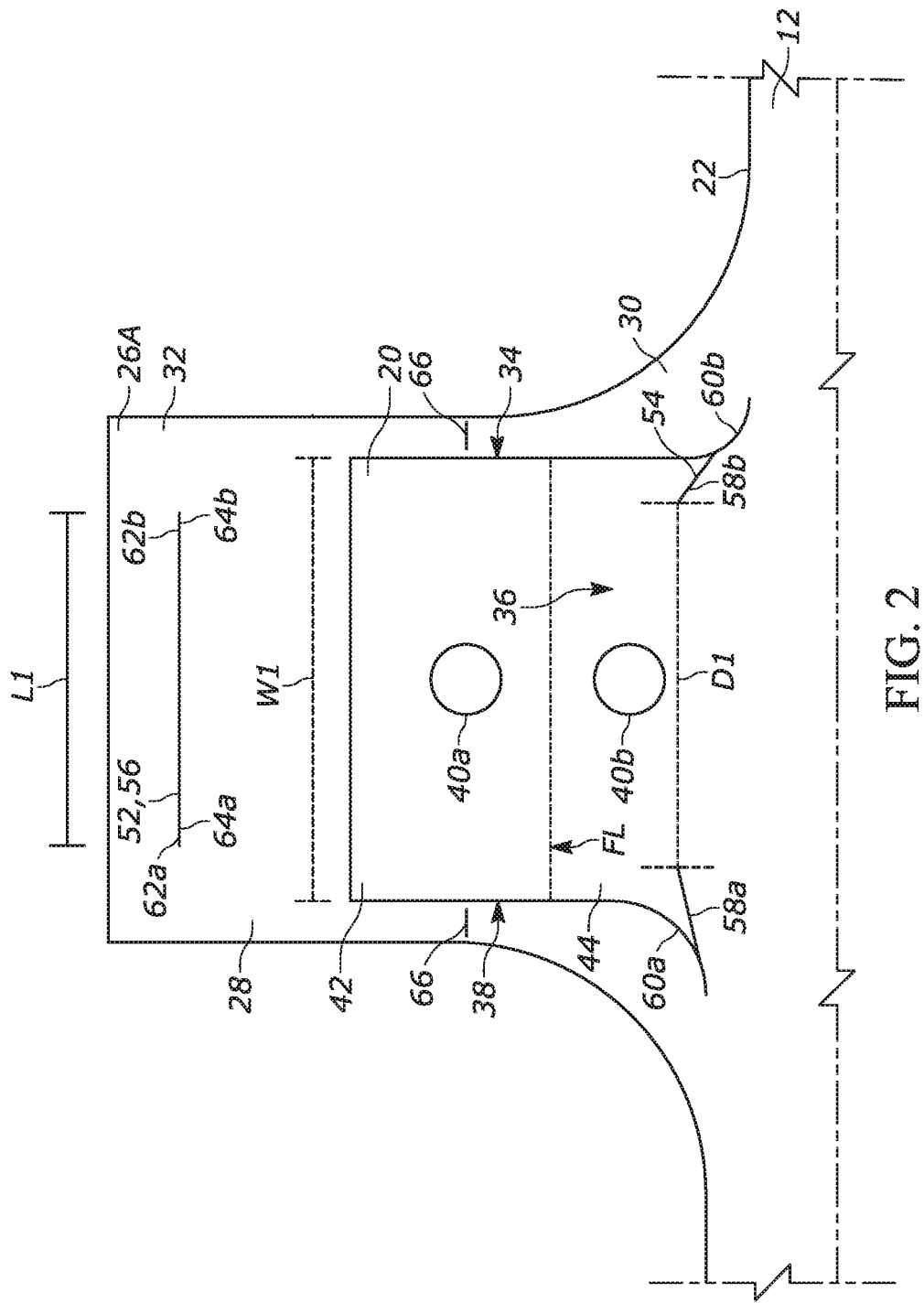

FIGS. 2-7 depict an example configuration for the wrap 26, which is indicated at 26A. The wrap 26A has a first end portion 30 where the wrap merges with the upper edge 22 of the curtain airbag 12, and an opposite, free second end portion 32. As shown in FIG. 2, an associated mounting tab 20 comprises a portion of the fabric extension 28 that forms the wrap 26A. Therefore, both the mounting tab 20 and the wrap 26A comprise an integral woven portion of the curtain airbag 12 formed from the same fabric extension 28 of the upper edge 22 of the curtain airbag. The mounting tab 20 is defined by a slit 34 that is cut through the fabric extension 28 and separates the mounting tab from the wrap 26A. Thus, as shown in FIG. 2, the mounting tab 20 comprises a central portion 36 of the fabric extension 28, and the wrap 26A comprises a portion of the fabric extension that extends along a periphery 38 of the mounting tab. FIG. 3 illustrates an isolated view of the fabric extension 28 having the central portion 36 of the fabric extension (and accordingly, the mounting tab 20) removed therefrom so that the portion of the fabric extension that defines the wrap 26A can be seen clearly.

As shown in FIG. 2, the mounting tab 20 can have at least one mounting tab aperture 40a, 40b for receiving a fastener (not shown) for mounting the packaged curtain airbag 12 to the vehicle. The mounting tab 20 can have a fold line FL for folding an upper portion 42 of the mounting tab over onto a lower portion 44 of the mounting tab. When the mounting tab 20 is folded over along the fold line FL, the mounting tab aperture 40a overlies the mounting tab aperture 40b positioned on the lower portion 44 of the mounting tab. A fastener can be inserted through the overlying mounting tab apertures 40a, 40b to mount the packaged curtain airbag 12 to the vehicle.

Figure 4:
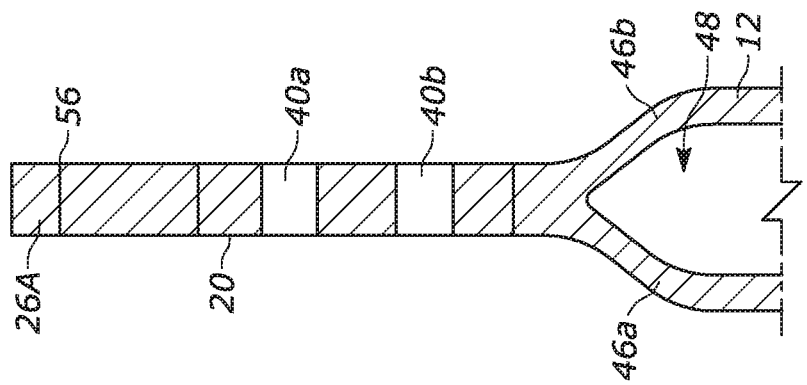
FIG. 4 is a sectional view of a portion of the apparatus of FIG. 2 having a first construction.

The wrap 26A can be an integral woven portion of a curtain airbag 12 regardless of whether the curtain airbag is an OPW curtain airbag or a curtain airbag that is formed from a plurality of woven pieces. FIG. 4 illustrates an example configuration of the wrap 26A and the mounting tab 20 where the curtain airbag 12 is an OPW curtain airbag. The OPW curtain airbag 12 can comprise two simultaneously woven fabric layers 46a, 46b that are interwoven in portions to form seams that define at least one inflatable chamber 48. As shown in FIG. 4, the wrap 26A and the mounting tab 20 can be an integral interwoven portion of the OPW curtain airbag 12. In FIG. 4, the wrap 26A and the mounting tab 20 are portions of the OPW curtain airbag 12 where the layers 46a, 46b are interwoven.

Figure 5:
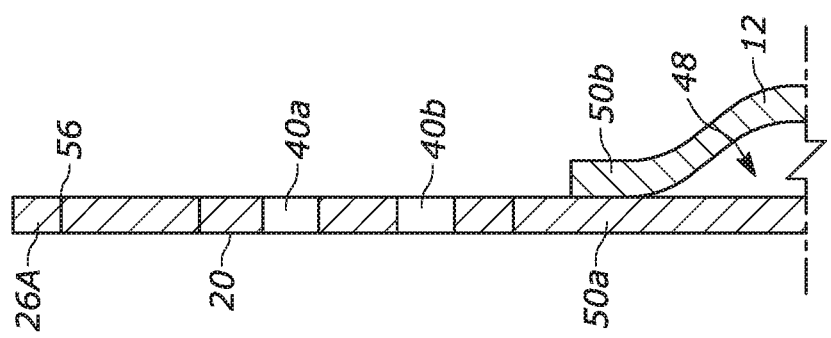
FIG. 5 is a sectional view of a portion of the apparatus of FIG. 2 having a second construction.

FIG. 5 illustrates an example configuration of the wrap 26A and the mounting tab 20 where the curtain airbag 12 is formed from a plurality of woven pieces that are interconnected to one another. As shown, the curtain airbag 12 includes a first woven piece 50a, such as an outboard panel, and a second woven piece 50b, such as an inboard panel. The inboard panel 50b is sewn or otherwise connected to the outboard panel 50a in portions to define at least one inflatable chamber 48 of the curtain airbag 12. The wrap 26A and the mounting tab 20 can be formed from an integral woven portion of one of the woven pieces that form the curtain airbag 12. In the example configuration of FIG. 5, the wrap 26A and the mounting tab 20 are formed from an integral woven portion of the outboard panel 50a. The wrap 26A and the mounting tab 20, however, can instead be formed from an integral woven portion of the inboard panel 50b.

Figure 6:
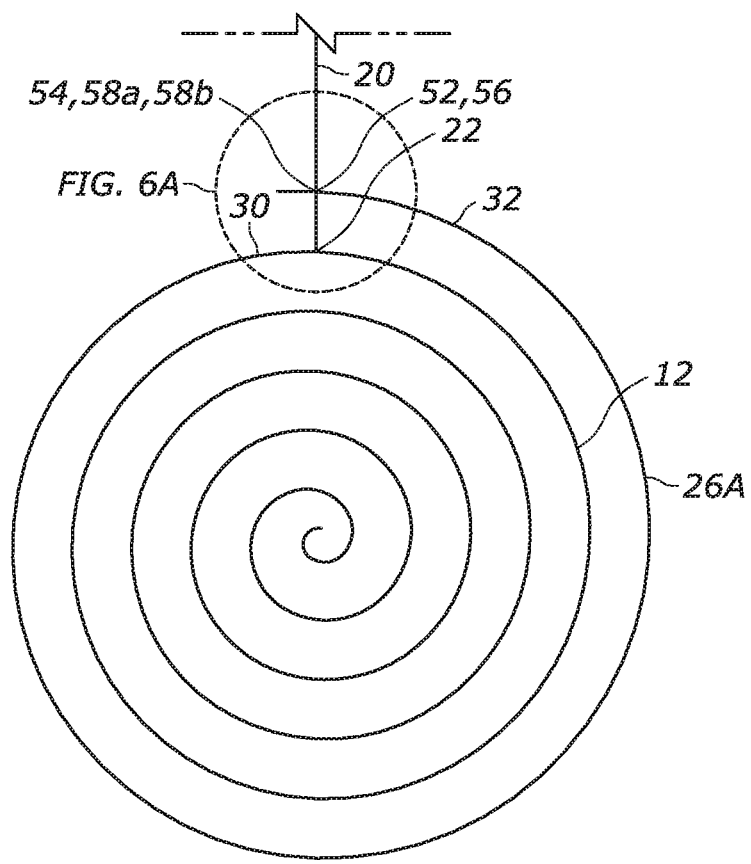
FIG. 6 is a schematic view of a portion of the apparatus of FIG. 2, including the apparatus in a packaged configuration.

As shown in FIG. 6, the wrap 26A is configured to be attached to the curtain airbag 12 along the upper edge 22 of the curtain airbag after being wrapped about the circumference of the rolled and/or folded stored curtain airbag. To accomplish this attachment, the second end portion 32 of the wrap 26A can comprise a retention feature 52 configured to cooperate with an attachment feature 54 positioned at the upper edge 22 of the curtain airbag 12. The retention feature 52 and the attachment feature 54 can both be formed from the curtain airbag fabric, such as from a portion of the fabric extension 28 that forms the wrap 26A and the mounting tab 20. In the example configuration of FIGS. 2-7, the retention feature 52 comprises a slit opening 56 in the second end portion 32 of the wrap 26A, and the attachment feature 54 comprises edge slits 58a, 58b formed in opposite edges 60a, 60b of the mounting tab 20. The slit opening 56 has a length L1 that is shorter than a width W1 of the mounting tab 20. The edge slits 58a, 58b are configured such that they terminate at a distance D1 from each other that is about equal to the length L1 of the slit opening 56.

Figure 6A:
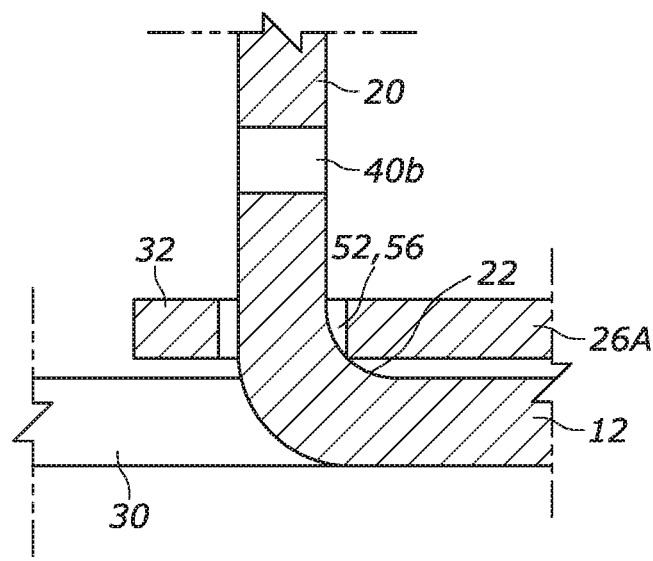
FIG. 6A is a magnified view of a portion of the apparatus depicted in FIG. 6.
Figure 7:
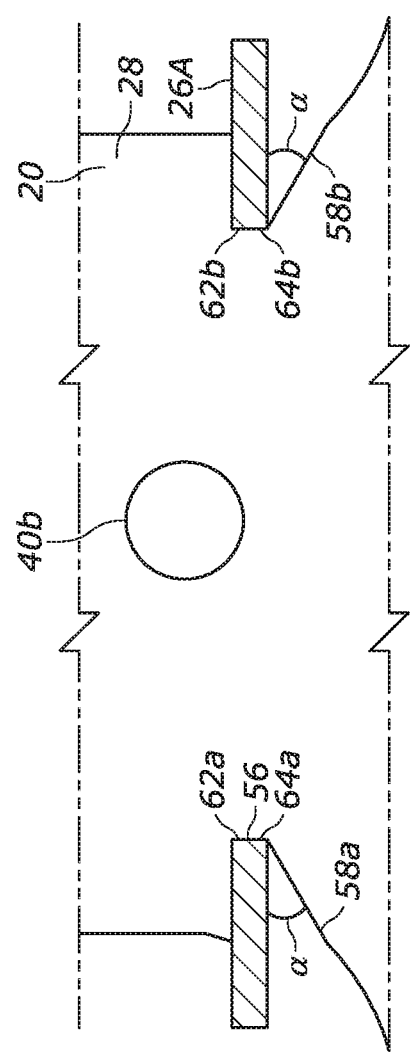
FIG. 7 is a partial sectional side view of a portion of the apparatus of FIG. 2, including the apparatus in a packaged configuration.

As shown in FIGS. 6-6A, after the wrap 26A is wrapped around the circumference of the stored curtain airbag 12, the mounting tab 20 (in either a folded or unfolded condition) is passed through the slit opening 56 in the second end portion 32 of the wrap. Although the width W1 of the mounting tab 20 is longer than the length L1 of the slit opening 56, the mounting tab is able to be passed through the slit opening because of the flexible nature of the fabric extension 28 that forms the mounting tab. Referring to FIG. 7, when the mounting tab 20 is passed through the slit opening 56, retention portions 62a, 62b of the wrap 26A at opposite ends 64a, 64b of the slit opening are received in the edge slits 58a, 58b to secure the second end portion 32 of the wrap to the mounting tab. The wrap 26A does not interfere with the mounting tab apertures 40a, 40b when the retention portions 62a, 62b of the wrap are received in the edge slits 58a, 58b. The edge slits 58a, 58b can thus be provided at any position along the opposite edges 60a, 60b of the mounting tab 20 that will not cause the wrap 26A to interfere with the mounting tab apertures 40a, 40b when the retention portions 62a, 62b of the wrap are received in the edge slits.

As shown in FIG. 7, the edge slits 58a, 58b can be configured to extend at an acute angle α with respect to the slit opening 56 of the wrap 26A when the mounting tab 20 is received in the slit opening. The acute angle α can be selected such that tension forces that would urge the mounting tab 20 to be removed from the slit opening 56 would urge the retention portions 62a, 62b of the wrap 26A into the edge slits 58a, 58b.

The attachment of the wrap 26A to the mounting tab 20 thus provides a secure connection between the second end portion 32 of the wrap and the upper edge 22 of the curtain airbag 12. This connection maintains the packaging of the curtain airbag 12 in the stored condition. The wrap 26A does, however, include at least one rupturable portion 66 (FIG. 2) configured to rupture in response to deployment of the curtain airbag 12. The wrap 26A thus holds the curtain airbag 12 packaged in the stored condition until the wrap ruptures in response to the deployment of the curtain airbag.

Figure 8:
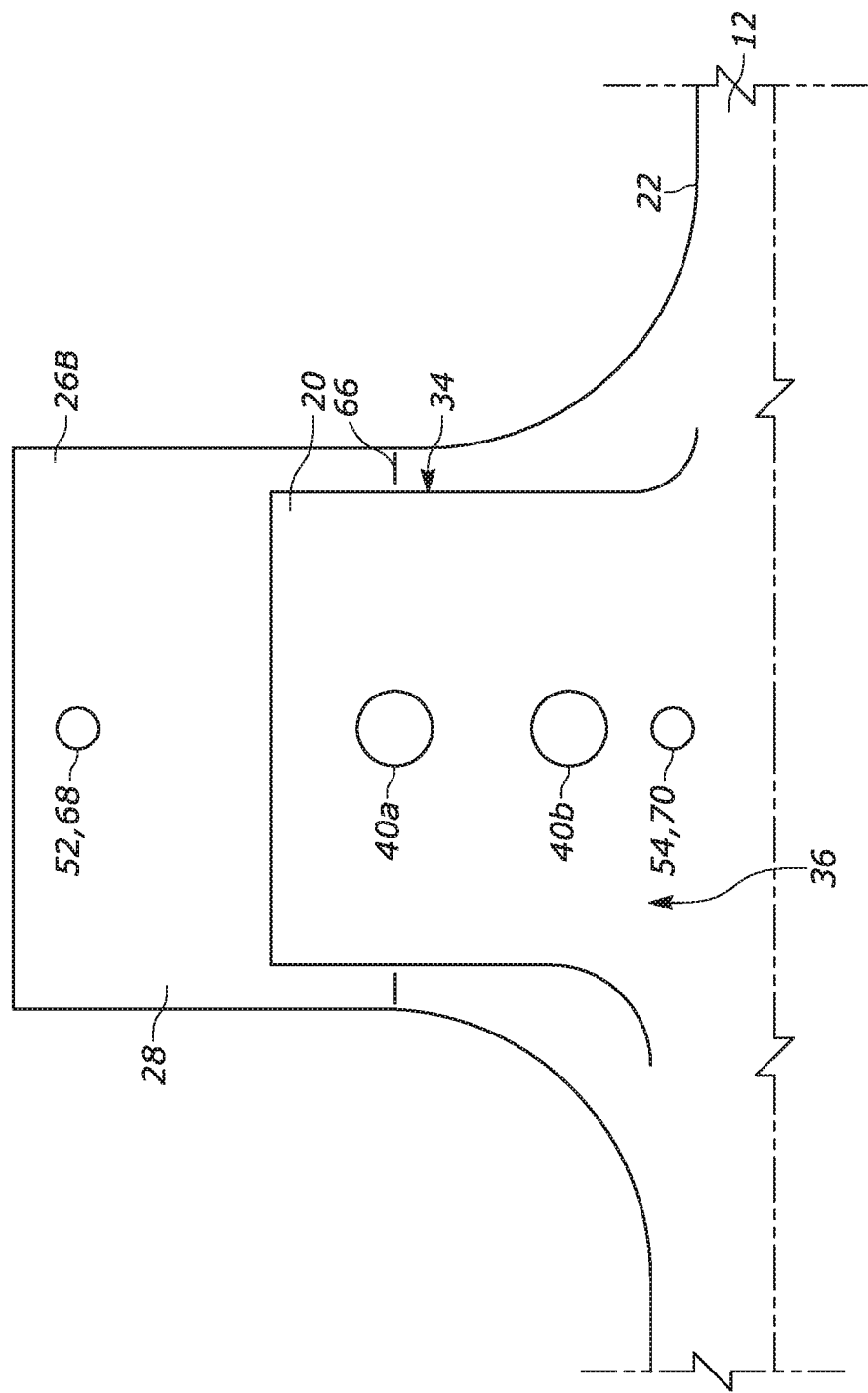
FIG. 8 is a side view of an element of the apparatus of FIG. 1, including another configuration for a portion of the apparatus.
Figure 9:
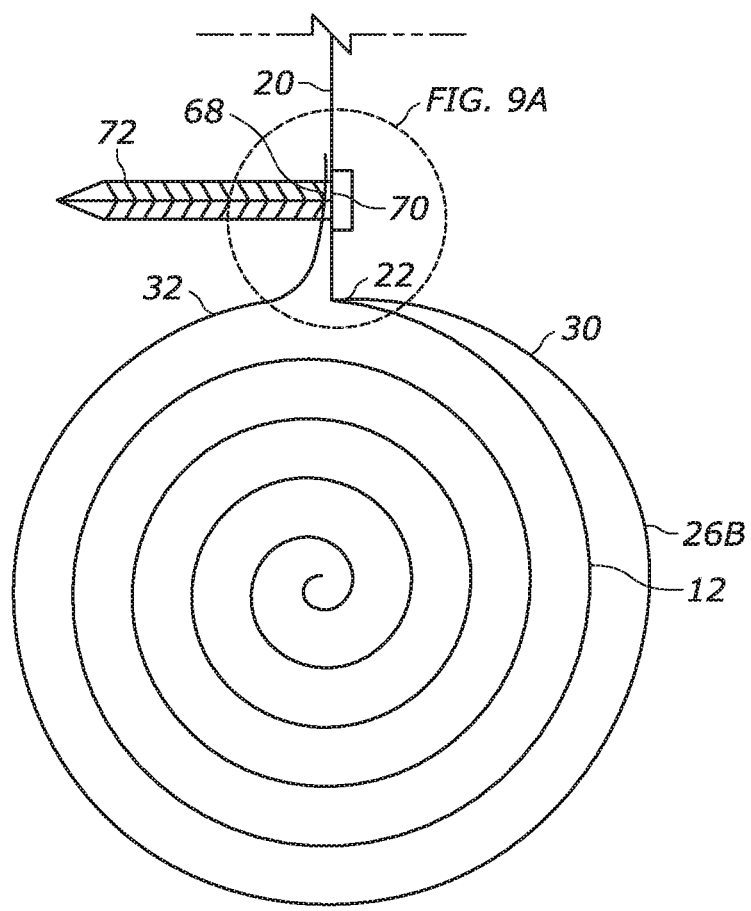
FIG. 9 is a schematic view of a portion of the apparatus of FIG. 8, including the apparatus in a packaged configuration.
Figure 9A:
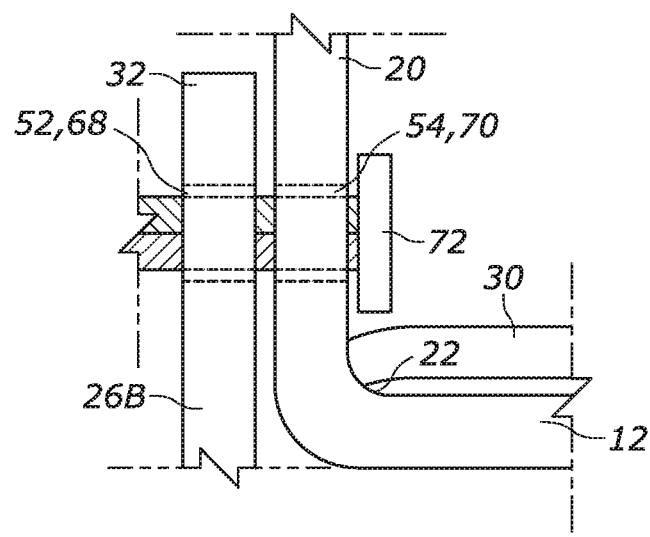
FIG. 9A is a magnified view of a portion of the apparatus depicted in FIG. 9.

FIGS. 8-9A depict another example configuration for the wrap 26, which is indicated at 26B. The wrap 26B of FIGS. 8-9A is similar the wrap 26A of FIGS. 2-7, except for the manner in which the wrap 26B is attached to the upper edge 22 of the curtain airbag 12. As shown in FIG. 8, the retention feature 52 of the wrap 26B comprises a wrap opening 68, and the attachment feature 54 comprises an associated mounting tab opening 70. As shown in FIGS. 9-9A, after the wrap 26B is wrapped around the circumference of the stored curtain airbag 12, the wrap opening 68 and the mounting tab opening 70 are positioned to overlie each other.

Referring to FIG. 8, the overlying wrap and mounting tab openings 68, 70 are configured to receive a fastening structure 72, such as a fir tree fastener, a push pin fastener, or a clip fastener, to attach the wrap 26B to the mounting tab 20. The fastening structure 72 extending through the overlying wrap and mounting tab openings 68, 70 also initially supports the packaged curtain airbag 12 in the vehicle. By "initially supporting" it is meant that the fastening structure 72 supports and aligns the packaged curtain airbag 12 relative to the vehicle so that additional fasteners can then be driven through the properly aligned, packaged curtain airbag to mount the packaged curtain airbag to the vehicle. In the example configuration shown in FIGS. 9-9A, the fastening structure 72 is a fir tree fastener. The fir tree fastener 72 inserted through the overlying wrap and mounting tap openings 68, 70 securely holds the wrap 26B attached to the upper edge 22 of the curtain airbag 12 so that curtain airbag is maintained packaged in the stored condition.

Figure 10:
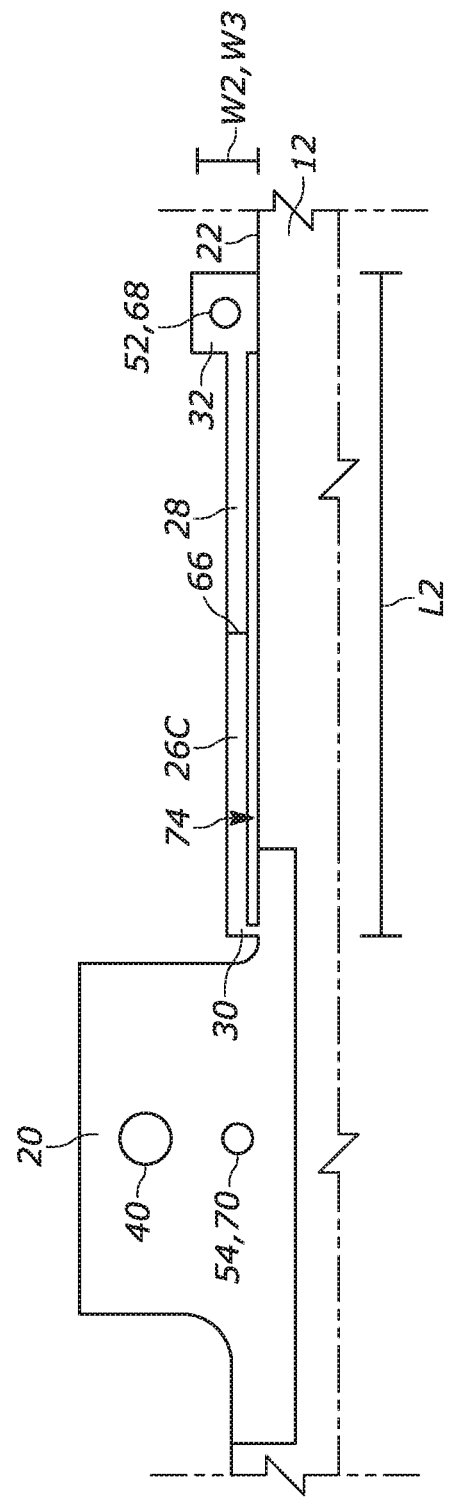
FIG. 10 is a side view of an element of the apparatus of FIG. 1, including another configuration for a portion of the apparatus.
Figure 11:
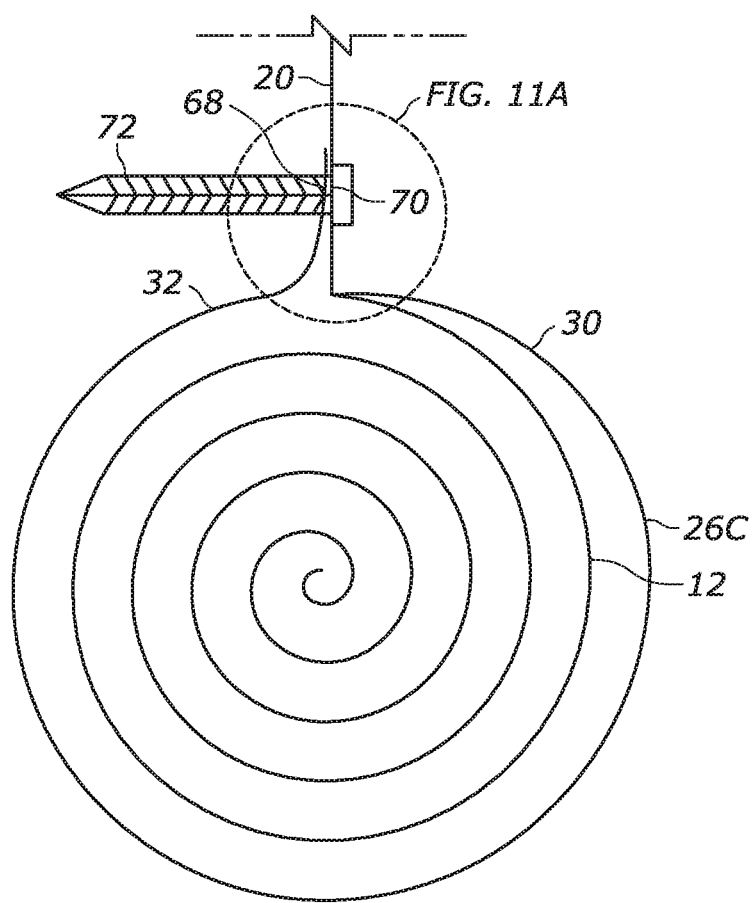
FIG. 11 is a schematic view of a portion of the apparatus of FIG. 10, including the apparatus in a packaged configuration.
Figure 11A:
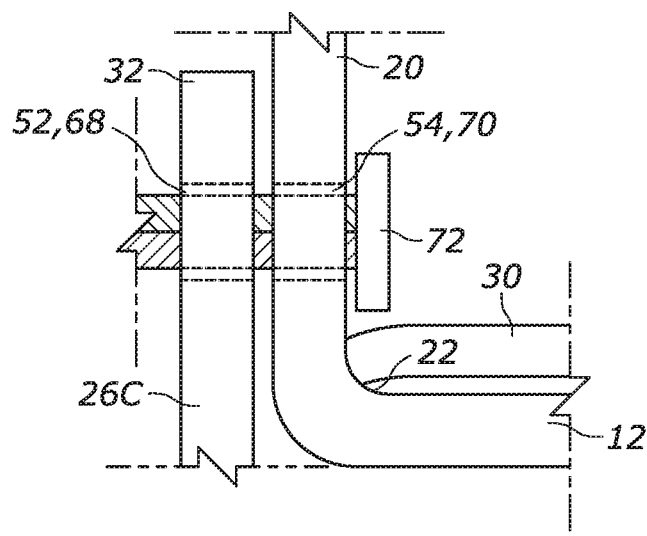
FIG. 11A is a magnified view of a portion of the apparatus depicted in FIG. 11.

FIGS. 10-11A depict another example configuration of the wrap 26, which is indicated at 26C. As shown in FIG. 10, the fabric extension 28 forming the wrap 26C has a length L2 measured lengthwise along the upper edge 22 of the curtain airbag 12. The wrap 26C is defined by a slit 74 cut lengthwise along the fabric extension 28 to separate the wrap from the upper edge 22 of the curtain airbag 12. The wrap 26C, in a lied flat and unfolded configuration, thus extends lengthwise along the upper edge 22 of the curtain airbag 12. The fabric extension 28 has a width W2 that is equal to the width W3 of the wrap 26C such that the integral addition of the wrap to the curtain airbag 12 requires only the fabric that forms the wrap.

The wrap 26C has a first end portion 30 where the wrap merges with the upper edge 22 of the curtain airbag 12, and an opposite, free second end portion 32 configured for a connection to the upper edge of the curtain airbag to maintain the curtain airbag packaged in the stored condition. The first end portion 30 of the wrap 26C can merge with the upper edge 22 of the curtain airbag 12 at a location that is spaced apart from an associated mounting tab 20. Thus, instead of the associated mounting tab 20 being cut from the same fabric extension 28 that forms the wrap 26C, the associated mounting tab can be formed separate from the fabric extension that forms the wrap.

To connect the second end portion 32 of the wrap 26C to the upper edge 22 of the curtain airbag 12, the second end portion of the wrap comprises a retention feature 52 configured to cooperate with an attachment feature 54 positioned at the upper edge of the curtain airbag. The retention feature 52 and the attachment feature 54 can be formed from the curtain airbag fabric. In the example configuration of FIG. 10, the retention feature 52 comprises a wrap opening 68 in the second end portion 32 of the wrap 26C, and the attachment feature 54 comprises an associated mounting tab opening 70. As shown in FIGS. 11-11A, after the wrap 26C is wrapped around the circumference of the rolled and/or folded curtain airbag 12, the wrap opening 68 and the mounting tab opening 70 are positioned to overlie each other. The overlying wrap and mounting tab openings 68, 70 are configured to receive a fastening structure 72 that is similar to that as discussed above, such as a fir tree fastener, a push pin fastener, or a clip fastener.

Alternatively, instead of comprising the wrap and mounting tab openings 68, 70, the retention feature 52 of the wrap 26C can include a slit opening 56 similar to that shown in FIG. 2, and the attachment feature 54 of the mounting tab 20 can include edge slits 58 similar to that shown in FIG. 2. In this configuration, the second end portion 32 of the wrap 26C can be sized so that the mounting tab 20 can be passed through the slit opening 56 in the second end portion the wrap. Once the mounting tab 20 is passed through the slit opening 56 in the second end portion of the wrap 26C, the slit opening 56 and the edge slits 58 can interact in a similar manner as discussed above with regard to the wrap 26A of FIGS. 2-7.

Figure 12:
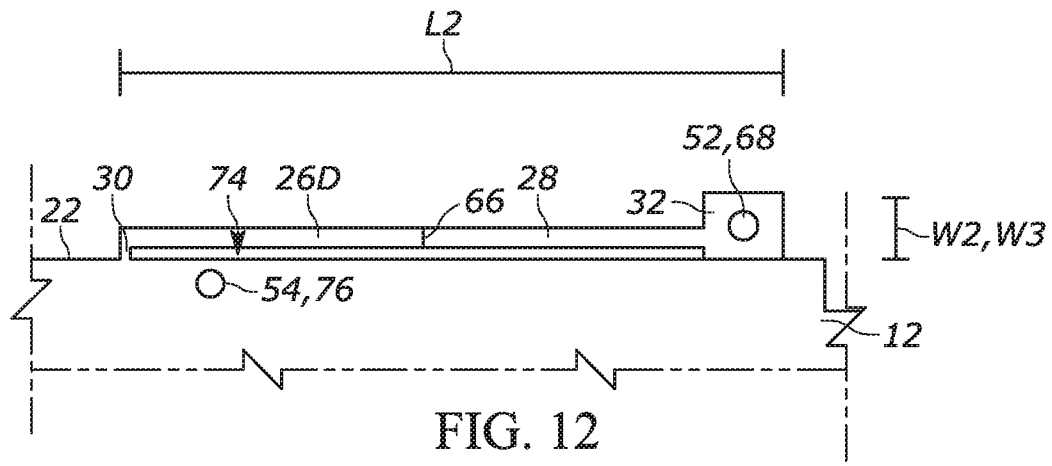
FIG. 12 is a side view of an element of the apparatus of FIG. 1, including another configuration for a portion of the apparatus.
Figure 13:
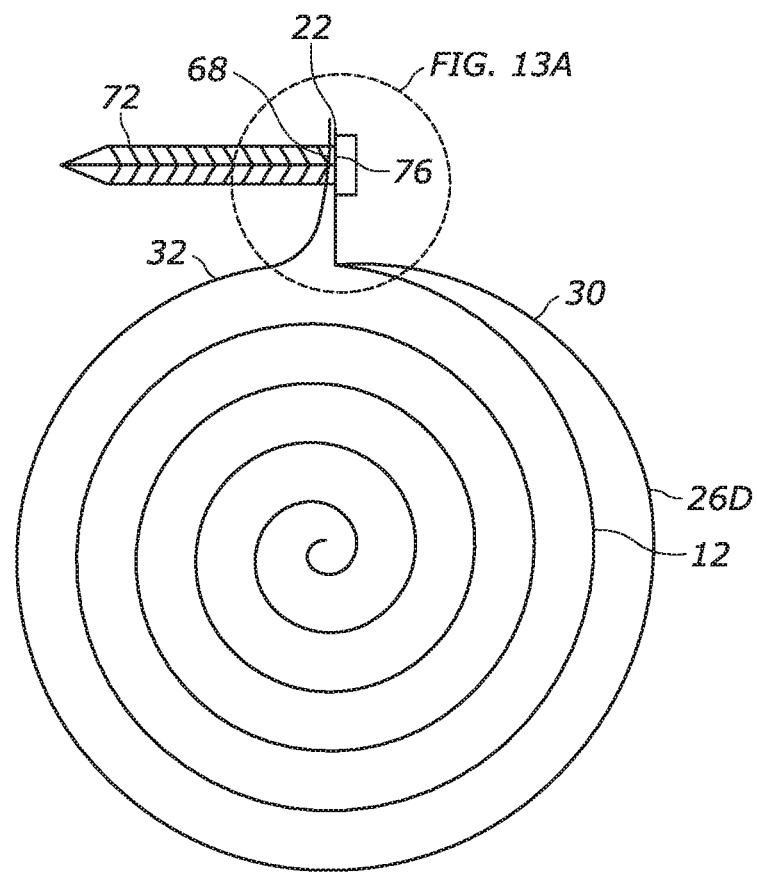
FIG. 13 is a schematic view of a portion of the apparatus of FIG. 12, including the apparatus in a packaged configuration.
Figure 13A:
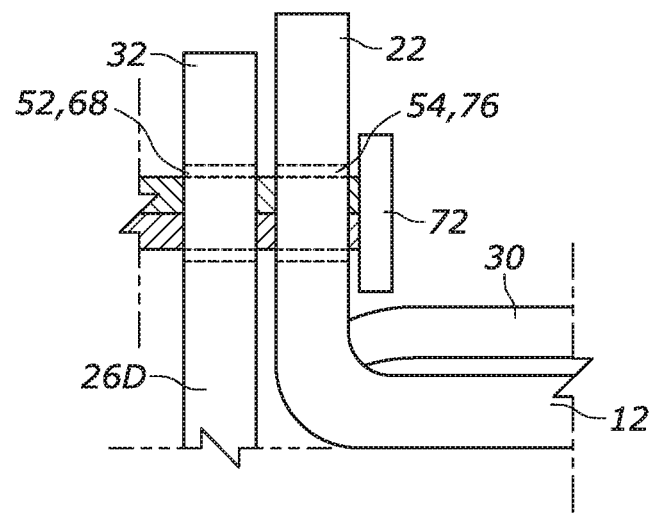
FIG. 13A is a magnified view of a portion of the apparatus depicted in FIG. 13.

FIGS. 12-13A depict another example configuration for the wrap 26, which is indicated at 26D. The wrap 26D of FIGS. 12-13A is similar the wrap 26C of FIGS. 10-11A, except that instead of cooperating with a mounting tab opening 70, the retention feature 52 of the wrap 26D cooperates with an associated opening 76 along the upper edge 22 of the curtain airbag 12. The first end portion 30 of the wrap 26D can merge with the upper edge 22 of the curtain airbag 12 at a location that is adjacent to or spaced apart from the opening 76. The opening 76 is configured to receive a fastening structure 72 for initially supporting the packaged curtain airbag in the vehicle. The opening 76 can be positioned between two mounting tabs 20 of the curtain airbag 12, between a mounting tab and a vehicle forward end of the curtain airbag, or between a mounting tab and a vehicle rearward end of the curtain airbag. The opening 76, however, can instead be positioned along the upper edge 22 of a curtain airbag 12 that does not include a mounting tab 20. In this configuration, the curtain airbag 12 can be secured to a support structure of the vehicle solely through one or more opening 76.

As shown in FIGS. 13-13A, after the wrap 26D is wrapped around the circumference of the stored curtain airbag 12, the wrap opening 68 and the opening 76 are positioned to overlie each other. The overlying openings 68, 76 are configured to receive and be attached to each other by a fastening structure 72 similar to that as discussed above. The fastening structure 72 inserted through the overlying openings 68, 76 securely holds the wrap 26D attached to the upper edge 22 of the curtain airbag 12 so that curtain airbag is maintained packaged in the stored condition.

Figure 14:
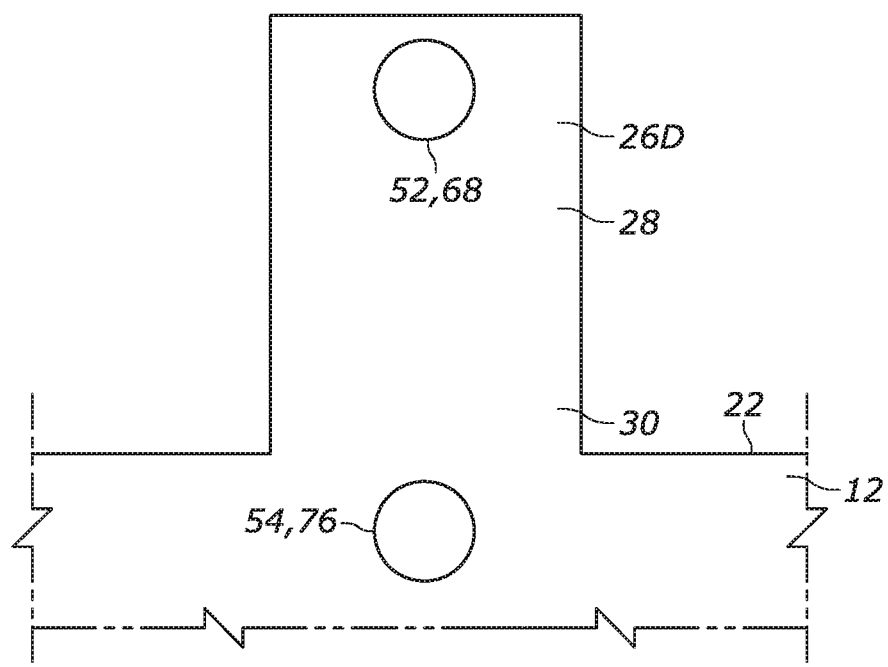
FIG. 14 is a side view of an element of the apparatus of FIG. 12, including another configuration for a portion of the apparatus.

Instead of extending lengthwise along the upper edge 22 of the curtain airbag 12, as shown in FIG. 12, the wrap 26D can extend perpendicularly upward from the upper edge of the curtain airbag, as shown in FIG. 14. The upwardly extending wrap 26D of FIG. 14 is wrapped about the circumference of the curtain airbag 12 and attached to the upper edge 22 of the curtain airbag in a similar manner as described above.

Figure 15:
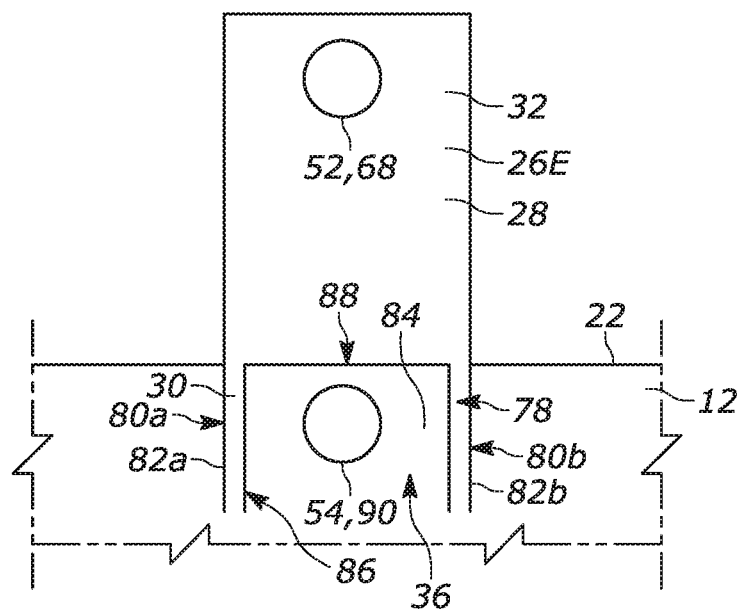
FIG. 15 is a side view of an element of the apparatus of FIG. 1, including another configuration for a portion of the apparatus.
Figure 16:
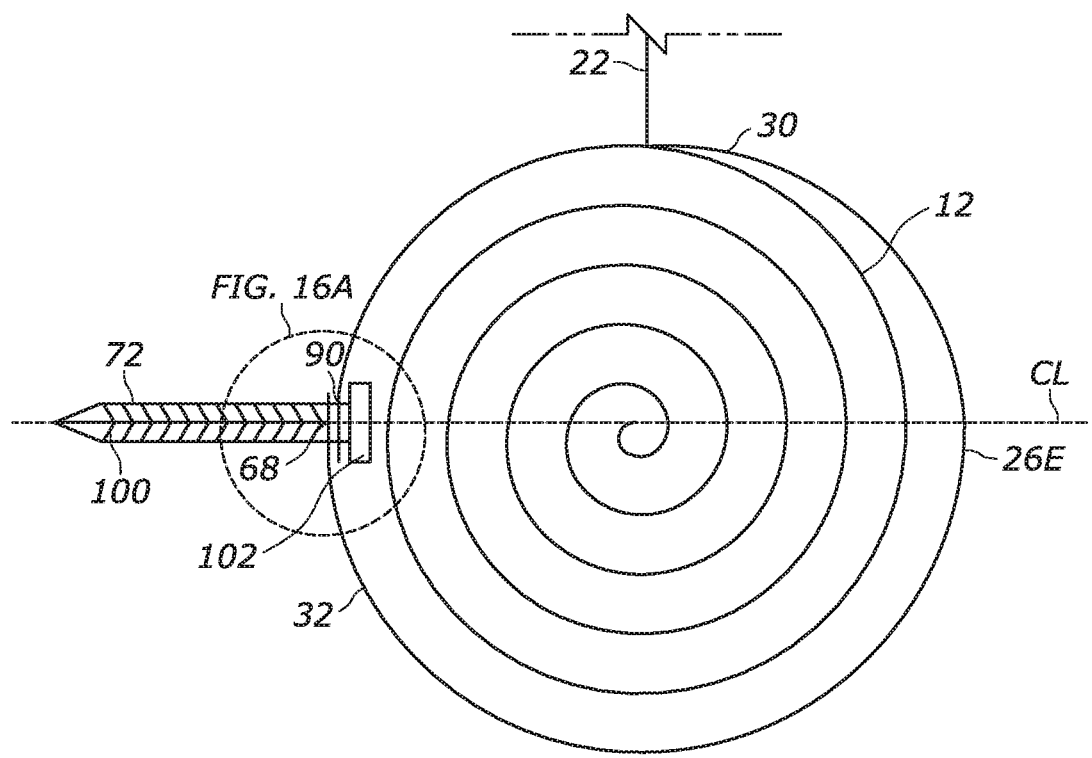
FIG. 16 is a schematic view of a portion of the apparatus of FIG. 15, including the apparatus in a packaged configuration.
Figure 16A:
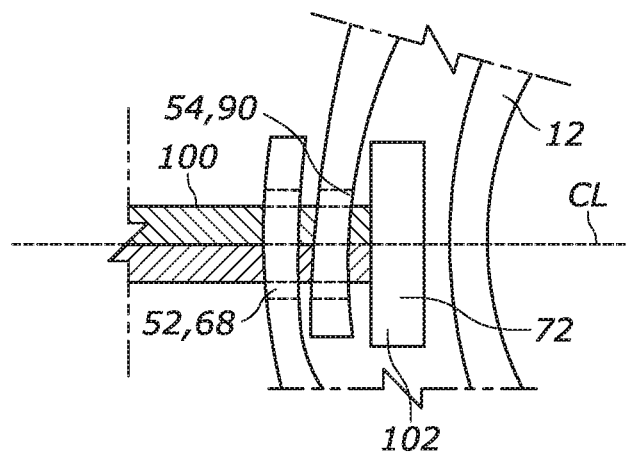
FIG. 16A is a magnified view of a portion of the apparatus depicted in FIG. 16.

FIGS. 15-16A depict another example configuration for the wrap 26, indicated at 26E. As shown in FIG. 15, the fabric extension 28 forming the wrap 26E includes a cut-out portion 78 that extends into the upper edge 22 of the curtain airbag 12. The cut-out portion 78 of the fabric extension 28 is defined by slits 80a, 80b that are cut through the curtain airbag fabric at the upper edge 22 of the curtain airbag 12 on opposing sides 82a, 82b of the cut-out portion. The wrap 26E is thus formed from the fabric extension 28, which includes the cut-out portion 78 of the fabric extension. The wrap 26E has a first end portion 30 where the wrap merges with the upper edge 22 of the curtain airbag 12, and an opposite, free second end portion 32. The first end portion 30 of the wrap 26E comprises the cut-out portion 78 of the fabric extension 28 and thus merges with the upper edge 22 of the curtain airbag 12 at the cut-out portion.

An associated securing tab 84 comprises a portion of the fabric extension 28 that forms the wrap 26E. Therefore, both the securing tab 84 and the wrap 26E comprise an integral woven portion of the curtain airbag 12 formed from the same fabric extension 28 of the upper edge 22 of the curtain airbag. The securing tab 84 is defined by a slit 86 that is cut through the fabric extension 28 that separates the securing tab 84 from the wrap 26E. The securing tab 84 comprises a central portion 36 of the fabric extension 28 and the wrap 26E comprises a portion of the fabric extension that extends along a periphery 88 of the securing tab.

As shown in FIG. 16, the wrap 26E and the securing tab 84 can be wrapped about the circumference of the stored curtain airbag 12 in opposing directions. The respective lengths of the wrap 26E and the securing tab 84 can be selected so that the curtain airbag 12 can be secured to the vehicle along a centerline CL of the stored curtain airbag. Attaching portions of the curtain airbag 12 to certain portions of the vehicle along the centerline CL of the stored curtain airbag may be desirable for certain curtain airbag configurations and/or vehicle models. Because the curtain airbag 12 can be attached/mounted to the vehicle through the securing tab 84, the securing tab can also function as a mounting tab.

As shown in FIGS. 16-16A, the wrap 26E is configured to be attached to the curtain airbag 12 at the associated securing tab 84 after both the wrap and the securing tab are wrapped about the circumference of the rolled and/or folded curtain airbag. To accomplish this, the second end portion 32 of the wrap 26E can comprise a retention feature 52 configured to cooperate with an attachment feature 54 positioned at the upper edge 22 of the curtain airbag 12. The retention feature 52 and the attachment feature 54 can both be formed from the curtain airbag fabric, such as from a portion of the fabric extension 28 that forms the wrap 26E and the securing tab 84. In the example configuration of FIGS. 15-16A, the retention feature 52 comprises a wrap opening 68 in the second end portion 32 of the wrap 26E, and the attachment feature 54 comprises an associated securing tab opening 90.

As shown in FIGS. 16-16A, after the wrap 26E and the securing tab 84 are wrapped about the circumference of the stored curtain airbag 12 in opposing directions, the wrap opening 68 and the securing tab opening 90 are positioned to overlie each other. The overlying wrap and securing tab openings 68, 90 are configured to receive a fastening structure 72, such as a fir tree fastener, a push pin fastener, or a clip fastener, to attach the wrap 26E to the securing tab 84. The fastening structure 72 extending through the overlying wrap and securing tab openings 68, 90 also initially supports the packaged curtain airbag 12 in the vehicle along the centerline CL of the packaged curtain airbag. In the example configuration shown in FIGS. 16-16A, the fastening structure 72 is a fir tree fastener. The fir tree fastener 72 inserted through the overlying wrap and securing tap openings 68, 90 securely holds the wrap 26E attached to the securing tab 84 so that curtain airbag 12 is maintained packaged in the stored condition.

Figure 17:
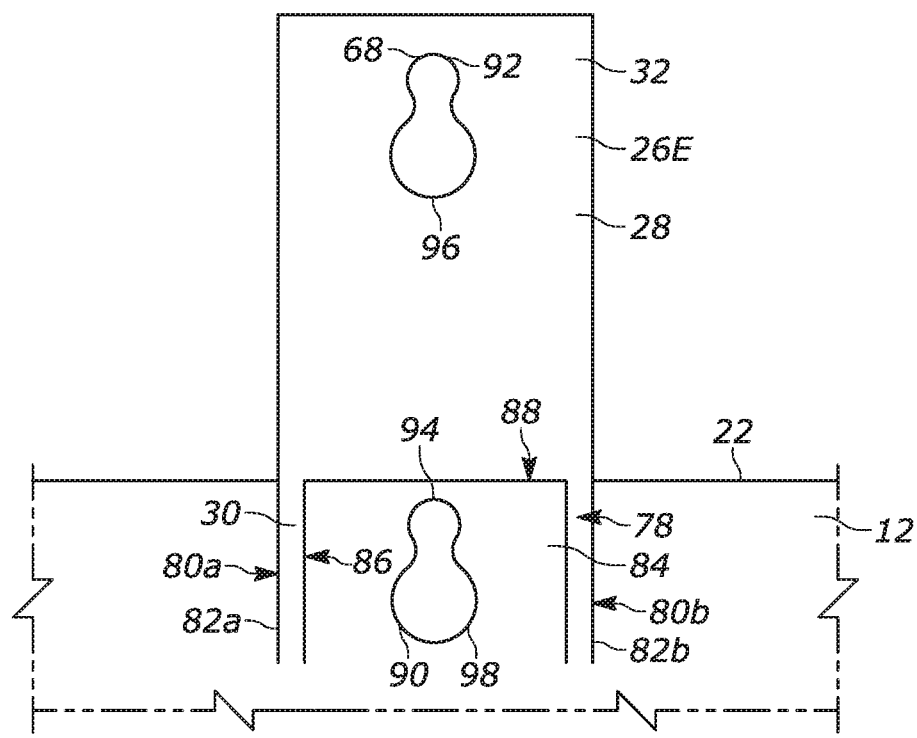
FIG. 17 is a side view of an element of the apparatus of FIG. 15, including another configuration for a portion of the apparatus.

As shown in FIG. 17, the wrap opening 68 of the wrap 26E and the securing tab opening 90 of the securing tab 84 can comprise keyhole openings. The keyhole openings 68, 90 have a small diameter upper portion 92, 94 and a large diameter lower portion 96, 98. The small diameter upper portions 92, 94 are dimensioned to be about equal to the diameter of a shank 100 of a fastening structure 72, but smaller than the diameter of a head 102 of the fastening structure so as to form an interference with a head of the fastening structure. An example shank 100 and head 102 of a fastening structure 72 can be seen in FIGS. 16-16A. Each of the small diameter upper portions 92, 94 is configured to tightly hold an inserted shank 100 of the fastening structure 72 to help prevent the fastening structure from being removed from the small diameter upper portion. The large diameter lower portions 96, 98 are larger than the small diameter upper portions 92, 94. The large diameter lower portions 96, 98 are dimensioned to be larger than the diameter of the shank 100 of the fastening structure 72. A fastening structure 72 can thus be more easily inserted into the large diameter lower portions 94, 98 than the small diameter upper portions 92, 94 as there will be at least some play between the shank 100 of the fastening structure and the large diameter lower portions.

In the configuration of FIG. 17, after the wrap 26E and the securing tab 84 are wrapped around the circumference of the stored curtain airbag 12 in opposing directions, the large diameter lower portion 96 of the keyhole opening 68 of the wrap and the large diameter lower portion 98 of the keyhole opening 90 of the securing tab 84 are positioned to overlie each other. A shank 100 of a fastening structure 72 is then inserted through the large diameter lower portions 96, 98 of the wrap 26E and securing tab 84 to attach the wrap to the securing tab. Once the shank 100 has been inserted through the large diameter lower portions 96, 98, the stored curtain airbag 12 can be permitted to partially unravel, while still maintaining a rolled and/or folded condition. The unraveling of the stored curtain airbag 12 increases the diameter of the stored curtain airbag, which pulls the wrap 26E and the securing tab 84 in opposing directions. As the wrap 26E and the securing tab 84 are pulled in opposing directions, the keyhole openings 68, 90 slide over the shank 100 so that the shank is moved from the large diameter lower portions 96, 98 into the small diameter upper portions 92, 94. Because the small diameter upper portions 92, 94 form an interference with the head 102 of the fastening structure 72 and tightly hold the shank 100, the fastening structure is maintained in the small diameter upper portions of the keyhole openings 68, 90 of the wrap 26E and securing tab 84. The maintained fastening structure 72 securely holds the wrap 26E attached to the securing tab 84 so that curtain airbag 12 is maintained packaged in the stored condition.

Although only the wrap 26E is described and depicted as having keyhole openings (FIG. 17), any of the example configurations of the wrap 26 can similarly have keyhole openings.

Certain configurations of the apparatus 10 can include a curtain airbag 12 having one or more of any of the example configurations of the wrap 26. For example, as shown in FIG. 1, a particular configuration of the apparatus 10 can include a curtain airbag 12 that has only one wrap 26A of the example configuration of FIGS. 2-7. Another particular configuration of the apparatus 10 can include multiple wraps 26A of the example configuration of FIGS. 2-7. Additionally, certain configurations of the apparatus 10 can include a curtain airbag 12 having more than one example configuration of the wrap 26. For example, a particular configuration of the apparatus 10 can include a curtain airbag 12 that has two wraps 26A of the example configuration of FIGS. 2-7, one wrap 26D of the example configuration of FIGS. 12-13A positioned between the two wraps 26A of the example configuration of FIGS. 2-7, and one wrap 26E of the example configuration of FIGS. 15-16A positioned between one of the two wraps 26A of the example configuration of FIGS. 2-7 and a vehicle forward end of the curtain airbag. In this configuration, the two wraps 26A of the example configuration of FIGS. 2-7 and the one wrap 26D of the example configuration of FIGS. 12-13A can be attached to the roof rail of the vehicle, and the wrap 26E of the example configuration of FIGS. 15-16A can be attached to an A-pillar of the vehicle. Those skilled in the art will appreciate that the configuration, number, and position of the wraps 26 can be chosen so as to accommodate any curtain airbag 12 and/or vehicle model configuration.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
   a curtain airbag having a stored condition in which the curtain airbag is deflated, flattened, and rolled and/or folded, the curtain airbag comprising a mounting tab for mounting the curtain airbag to the vehicle; and
   a wrap comprising an integral woven portion of the curtain airbag formed from a fabric extension of an upper edge of the curtain airbag, the wrap being configured to be wrapped about a circumference of the rolled and/or folded curtain airbag to package the curtain airbag in the stored condition, the wrap being configured to be attached to the mounting tab after being wrapped about the circumference of the rolled and/or folded curtain airbag;
   wherein the mounting tab comprises a portion of the fabric extension defined by a slit that separates the mounting tab from the wrap, the mounting tab comprising a central portion of the fabric extension, the wrap comprising a portion of the fabric extension that extends along a periphery of the mounting tab.

2. The apparatus recited in claim 1, wherein the wrap has a first end portion where the wrap merges with the upper edge of the curtain airbag, and an opposite, free second end portion configured for a connection to the mounting tab of the curtain airbag to maintain the packaging of the curtain airbag in the stored condition.

3. The apparatus recited in claim 2, wherein the second end portion of the wrap comprises a retention feature configured to cooperate with an attachment feature positioned at the mounting tab of the curtain airbag.

4. The apparatus recited in claim 3, wherein the retention feature and the attachment feature are formed from curtain airbag fabric.

5. The apparatus recited in claim 1, wherein the wrap has a free end portion with a retention feature that cooperates with an attachment feature of the airbag to maintain the packaging of the curtain airbag in the stored condition.

6. The apparatus recited in claim 1, wherein the second end portion of the wrap comprises a retention feature configured to cooperate with an attachment feature positioned at the mounting tab of the curtain airbag; and
wherein the retention feature comprises a slit opening in the second end portion of the wrap, and the attachment feature comprises edge slits formed in opposite edges of the mounting tab, wherein the mounting tab is configured to pass through the slit opening in the second end portion of the wrap, and wherein retention portions of the wrap at opposite ends of the slit opening are configured to be received in the edge slits to secure the second end portion of the wrap to the mounting tab.

7. The apparatus recited in claim 6, wherein the slit opening has a length that is shorter than a width of the mounting tab, and wherein the edge slits are configured such that they terminate a distance from each other that is about equal to the length of the slit opening.

8. The apparatus recited in claim 7, wherein the edge slits are configured to extend at an acute angle with respect to the slit opening when the mounting tab is received in the slit, and wherein the acute angle is selected such that tension forces that would urge the mounting tab to be removed from the slit opening would urge the retention portions of the wrap into the edge slits.

9. The apparatus recited in claim 6, wherein the retention feature and the attachment feature comprise a wrap opening and an associated mounting tab opening for receiving a fastening structure for initially supporting the packaged curtain airbag in the vehicle, wherein the wrap opening and mounting tab opening are configured to overlie each other when the curtain airbag is in the packaged condition.

10. The apparatus recited in claim 9, wherein the fastening structure comprises one of a fir tree fastener, a push pin fastener, and a clip fastener.

11. The apparatus recited in claim 9, wherein the wrap opening and the mounting tab opening are keyhole openings.

12. The apparatus recited in claim 11, wherein the keyhole openings have a small diameter upper portion and a large diameter lower portion, the small diameter upper portion being dimensioned to be about equal to a diameter of a shank of the fastening structure and to form an interference with a head of the fastening structure, the large diameter lower portion being larger than the small diameter upper portion and the shank of the fastening structure.

13. The apparatus recited in claim 1, wherein the wrap has a rupturable portion configured to rupture in response to deployment of the curtain airbag.

14. The apparatus recited in claim 1, wherein the curtain airbag is a one-piece woven curtain airbag, the wrap being an integral woven portion of the OPW curtain airbag.

15. The apparatus recited in claim 1, wherein the curtain airbag is formed from a plurality of woven pieces that are interconnected to one another, the wrap being an integral woven portion of the woven pieces that form the curtain airbag.

16. A curtain airbag module comprising the apparatus of claim 1 and an inflator for inflating the curtain airbag.

17. A vehicle safety system comprising the curtain airbag module of claim 16 and a controller configured to actuate the inflator to cause deployment of the curtain airbag in response to detecting a vehicle crash condition.

18. The apparatus recited in claim 1, wherein the fabric extension forming the wrap includes a cut-out portion that extends into the upper edge of the curtain airbag, the cut-out portion of the fabric extension being defined by slits that are cut through curtain airbag fabric at the upper edge of the curtain airbag on opposing sides of the cut-out portion; and
wherein the mounting tab is defined by a slit that is cut through the fabric extension and separates the mounting tab from the wrap.

19. An apparatus for helping to protect an occupant of a vehicle, comprising:
a fastener;
a curtain airbag having a stored condition in which the curtain airbag is deflated, flattened, and rolled and/or folded, the curtain airbag having an opening adjacent an upper edge of the curtain airbag for receiving the fastener; and
a wrap comprising an integral woven portion of the curtain airbag formed from a fabric extension of the upper edge of the curtain airbag, the wrap having a wrap opening for receiving the fastener, the wrap being configured to be wrapped about a circumference of the rolled and/or folded curtain airbag to package the curtain airbag in the stored condition, the wrap opening and the opening adjacent the upper edge of the curtain airbag overlying one another when the curtain airbag is packaged,
wherein the fastener is configured to be inserted through the overlying openings to attach and hold the wrap attached to the upper edge of the curtain airbag so that the curtain airbag is maintained packed in the stored condition.

20. The apparatus recited in claim 19, wherein the wrap has a first end portion where the wrap merges with the upper edge of the curtain airbag, and an opposite, free second end portion having the wrap opening.

21. The apparatus recited in claim 20, wherein the curtain airbag comprises a mounting tab at the upper edge of the curtain airbag for mounting the curtain airbag to the vehicle, the opening adjacent the upper edge of the curtain airbag being on the mounting tab so that the wrap is configured to be attached to the mounting tab via the fastener after being wrapped about the circumference of the rolled and/or folded curtain airbag.

22. The apparatus recited in claim 19, wherein the fastening structure comprises one of a fir tree fastener, a push pin fastener, and a clip fastener.

23. The apparatus recited in claim 19, wherein the wrap opening and the opening adjacent the upper edge of the curtain airbag are keyhole openings.

24. The apparatus recited in claim 23, wherein the keyhole openings have a small diameter upper portion and a large diameter lower portion, the small diameter upper portion being dimensioned to be about equal to a diameter of a shank of the fastening structure and to form an interference with a head of the fastening structure, the large diameter lower portion being larger than the small diameter upper portion and the shank of the fastening structure.

25. The apparatus recited in claim 23, wherein the fabric extension has a length measured lengthwise along the upper edge of the curtain airbag, wherein the wrap is defined by a slit cut lengthwise along the extension to separate the wrap from the upper edge of the curtain airbag.

26. The apparatus recited in claim 25, wherein the fabric extension has a width that is equal to the width of the wrap such that an integral addition of the wrap to the curtain airbag requires only the fabric that forms the wrap.

27. The apparatus recited in claim 25, wherein the wrap, in a lied flat and unfolded configuration, extends lengthwise along the upper edge of the curtain airbag.

28. The apparatus recited in claim 19, wherein the wrap has a rupturable portion configured to rupture in response to deployment of the curtain airbag.

29. The apparatus recited in claim 19, wherein the curtain airbag is a one-piece woven curtain airbag, the wrap being an integral woven portion of the OPW curtain airbag.

30. The apparatus recited in claim 19, wherein the curtain airbag is formed from a plurality of woven pieces that are interconnected to one another, the wrap being an integral woven portion of the woven pieces that form the curtain airbag.

31. A curtain airbag module comprising the apparatus of claim 19 and an inflator for inflating the curtain airbag.

32. A vehicle safety system comprising the curtain airbag module of claim 31 and a controller configured to actuate the inflator to cause deployment of the curtain airbag in response to detecting a vehicle crash condition.

* * * * *